United States Patent

[11] 3,572,661

| [72] | Inventor | Hans Muller |
| | | Im Allmendli 1, Erlenbach, Zurich, Switzerland |
| [21] | Appl. No. | 811,752 |
| [22] | Filed | Apr. 1, 1969 |
| [45] | Patented | Mar. 30, 1971 |
| [32] | Priority | Apr. 4, 1968 |
| [33] | | Switzerland |
| [31] | | 5026/68 |

[54] ADMIXING OF GASEOUS AND LIQUID PHASES
6 Claims, 1 Drawing Fig.

[52] U.S. Cl. .................................................. 261/86, 261/93
[51] Int. Cl. ..................................................... B01f 3/04
[50] Field of Search ........................................ 261/26, 27, 93, 86, 87; 62/136

[56] References Cited
UNITED STATES PATENTS

| 1,449,458 | 3/1923 | Sutermeister | 62/136X |
| 1,505,204 | 8/1924 | Kiernan | 261/93 |
| 2,131,510 | 9/1938 | Gray et al. | 62/136 |
| 2,246,560 | 6/1941 | Weinig et al. | 261/93 |
| 2,308,751 | 1/1943 | Guthrie et al. | 261/93 |
| 2,542,031 | 2/1951 | Humfeld et al. | 261/93 |
| 2,615,697 | 10/1952 | Valentine | 261/93 |
| 2,760,344 | 8/1956 | Oltz | 62/136 |
| 3,400,051 | 9/1968 | Hofschneider | 261/93 |

Primary Examiner—Tim R. Miles
Attorney—Michael S. Striker

ABSTRACT: A method and an apparatus for admixing a liquid phase and a gaseous phase. A mixing vessel has a mixing chamber and is provided with first and second inlet means for a gaseous and a liquid phase, respectively, and with first and second outlet means for removing the liquid and gaseous phase, respectively. Mixing means including rotary means is arranged in the chamber for admixing the two phases and is subjected to encountering varying degrees of retardation of its rotation as a function of the consistency of the mixture. Control means is associated with at least one of the first inlet and outlet means and with the mixing means and serves to control the flow of the liquid phase through the respective first inlet or outlet means, and thereby the level of the liquid phase in the chamber, in dependence upon the degree of retardation encountered by the mixing means.

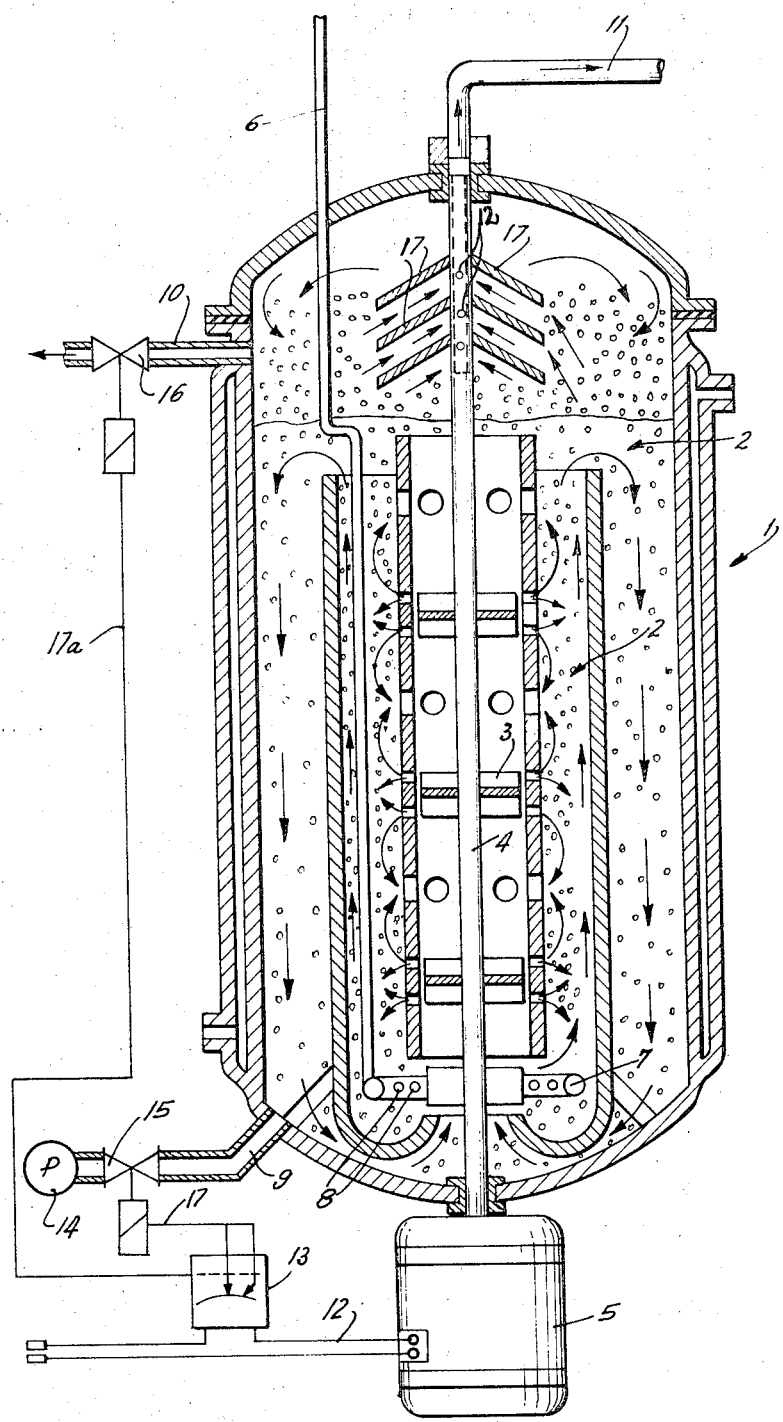

ADMIXING OF GASEOUS AND LIQUID PHASES

BACKGROUND OF THE INVENTION

The present invention relates to mixing in general, and more particularly to the admixture of liquid and gaseous phases. Still more particularly the invention relates to a method of effecting such admixing and to an apparatus for carrying out the method.

Mixing apparatus for admixing of liquid and gaseous phases is already known, for instance from my copending application entitled "Mixer" and filed on Jul. 3, 1967 under Ser. No. 651,054 now U.S. Pat. No. 3,460,810. Reference may be had to this application for details of the construction of such mixing arrangements as well as for background concerning the applications in which such mixing arrangements are needed.

A particular application is the admixture—in fermentation processes—of the nutritive substrate as a liquid phase with a gaseous phase. In the continuous operation of such a process and fermentation apparatus the nutritive substrate is continuously introduced into the fermentation apparatus and removed at another location of the apparatus as converted substrate. For instance, in a fermentation process under normal pressure the substrate is introduced into the apparatus near the bottom thereof and the resulting product is withdrawn near the top of the apparatus. Where the fermentation process is carried out under pressure the removal of the product must be controlled by a level-regulating arrangement, but this approach does not work in applications where the addition of large quantities of gaseous phase will not let an actual liquid level develop. In such applications the entire container or at least a significant portion thereof is filled with foam.

As set forth in aforementioned copending application, it is under these circumstances usually the practice to provide a foam separator which serves to withdraw excess gaseous phase in a foam-free manner, that is without significant admixture thereof of liquid phase. However, the liquid phase itself which is to be withdrawn from the apparatus contains gas bubbles and is reminiscent of an emulsion, with the result that conventional level-regulating devices will not work.

SUMMARY OF THE INVENTION

It is, accordingly, an object of the present invention to overcome the aforementioned problems.

More particularly it is an object of the present invention to provide for the regulation of inflow and outflow of the nutritive substrate in continuous operation and to enable automatic regulation of the level of the substrate in the apparatus even where the apparatus is largely or completely filled with foam.

In accordance with one feature of my invention I provide a method of admixing a gaseous phase and a liquid phase which involves the steps of admitting a liquid phase and a gaseous phase into a mixing chamber, and agitating the phases in the mixing chamber by rotating a mixing instrumentality therein. This results in intimate admixture of the phases but also in concomitant formation of foam in the mixing chamber. The more foam develops, the stronger it will retard the rotation of the mixing instrumentality, and this retardation is a function of the consistency of the foam. In accordance with my invention I control the quantity of liquid phase in the mixing chamber in dependency upon the degree of retardation which is experienced by the mixing instrumentality.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic vertical section through an apparatus for carrying out my invention.

DESCRIPTION OF THE PREFERRED EMBODIMENTS

Discussing now the drawing in detail it will be seen that I provide a mixing apparatus which basically corresponds to an embodiment illustrated and described in more detail in my aforementioned copending application. Into this apparatus there is to be introduced a liquid phase constituting the nutritive substrate, and air or oxygen constituting the gaseous phase which serves for enabling the microbiological oxidative processes which are to take place in the nutritive substrate. To make possible that these desired processes will go forward, the liquid and gaseous phases must be intimately admixed so that a foam or emulsion is formed consisting of substrate and air or oxygen in which the processes take place. The air or oxygen which is not needed, that is which is in excess of that needed, is removed together with the gaseous reaction products—i.e., carbon dioxide—from the interior of the vessel.

The vessel is generally indicated with reference numeral 1 in the FIGURE, and it will be seen that it is provided in its interior with a mixture 2 of gaseous and liquid phases. Rotary mixing means is provided in the interior of the chamber and is here constituted by a rotary shaft 4 on which there are mounted paddles 3 or other rotary mixing instrumentalities. The shaft 4 is rotated by an electromotor 5 which is connected with it. The upper end of the shaft 4 is provided with a hollow extension 11 and with a plurality of apertures 12 which communicate with the interior of the hollow extension 11 and through which the excess gaseous phase together with the gaseous reaction products may escape in the direction indicated by the arrows. The upper end of the shaft 4 also carries foam separators 17 which serve to separate the gaseous and liquid components of this foam so that the escaping excess gaseous phase will not carry any significant portions of the liquid phase along with it.

Reference numeral 6 indicates a conduit through which gaseous phase is introduced into the interior of the vessel 1, and it will be seen that this conduit extends through the top of the vessel 1 and down to the bottom region thereof where it communicates with an annular conduit 7 provided with a plurality of apertures 8 through which the gaseous phase can escape into the interior of the vessel 1. An inlet conduit 9 is provided through which the nutritive substrate, that is the liquid phase, is introduced into the interior of the vessel 1 and an outlet conduit 10 serves for evacuation of the converted substrate from the vessel 1.

Thus far, the construction of the apparatus is known from aforementioned copending application.

In accordance with my present invention, however, I interpose an ampere meter 13 in the electric supply line 12 supplying the motor 5 with electric energy. The ampere meter 13 which is of known construction is provided with adjustable limit contacts. A suitable pump 14, such as a membrane pump or the like, serves for supplying the liquid substrate through the inlet conduit 9 into the interior of the vessel 1. An electrically operable valve 15 of known construction is interposed in the inlet conduit 9, and a similar valve 16 is interposed in the outlet conduit 10. An electric circuit 17 connects the valve 15 with the ampere meter 13, and a similar circuit 17a connects the ampere meter with the valve 16.

In the operation of this apparatus it will be appreciated that if too much liquid phase is accumulated in the container 1, the foam will contain more liquid with respect to its content of gaseous phase than if less liquid is contained in the vessel 1. The more liquid there is contained in the foam, however, the firmer will be its consistency and the more it will resist rotation of the shaft 4 with its associated mixing instrumentalities 3. This results in retardation of the rotation and the electromotor 5, attempting to overcome the increased retarding forces, will draw more power in its supply line 12.

One of the limit contacts of the ampere meter 13 may be used for setting the maximum liquid content which is desired or permissible in the foam, and the other contact may be used for setting the minimum content. If now the electric power drawn through the line 12 and measured by the ampere meter 13 is such that the upper limit set by one of the limit contacts is reached, then the valve 15 throttles or reduces the incoming quantity of liquid phase through the inlet conduit 9. Of course, in place of the valve 15, the control could be effected via the pump 14 by throttling operation of the same or terminating its operation.

In addition to this measure, or in place of this measure, the quantity of converted substrate or liquid phase which leaves the interior of the vessel 1 through the outlet conduit 10 may be increased by opening the valve 16 wider, also in response to the limit set by the one limit contact being reached. In either case, however, the level of liquid phase in the vessel 1 will be controlled as a function of the degree of retardation encountered by the mixing means.

As the level of liquid phase in the vessel 1 decreases, the foam will contain less liquid phase with relation to its content of gaseous phase, and will therefore offer less retardation to rotation of the rotary mixing means. This, in turn, results in a decrease of the electric power requirements of the electromotor 5 so that the indicator of the ampere meter 13 moves downwardly away from the upper limit contact. As this occurs the outlet of liquid phase through the outlet conduit 10 may again be throttled by operation of the valve 16, and as the lower limit contact is reached, the pump 14 is again started or brought to full operation, or the valve 15 is opened or opened wider than before.

It will be appreciated that modifications of the disclosed exemplary embodiment will be readily possible and evident to those skilled in the art. Thus, the control of the inlet conduit 9 and the outlet conduit 10, and of course the flow of liquid phase through them, may be effected not by the electromotor 5 driving the mixing means, but by a separate electromotor driving only the foam separator 17, if such a separate electromotor is provided. This would normally be the case if foam is expected to fill only a relatively small part of the interior of the vessel 1. In that case, the foam separator 17 will be located in that part of the interior of the vessel 1 which will normally be filled with the foam and the remainder of the mixing means will be located in that part wherein the liquid phase does not contain so much gaseous phase as to form a foam therewith. Of course, the ampere meter 13 will then be interposed in the electricity supply line of the separate motor for the foam separator 17, and the circuits 17 and 17a will be correspondingly reconnected. To avoid misunderstanding it is pointed out that term "retardation" as used herein does not refer to a slowing down in the rotation of the rotary mixing means, that is to a decrease in the number of rotations per minute. What the term implies is a braking effect exerted upon the mixing means; however, the number of rotations thereof is not decreased by this effect. Instead, the electromotor is subjected to a greater load—and therefore draws more electrical energy—in order to maintain the number of rotations unchanged despite the braking effect.

It will be understood that each of the elements described above, or two or more together, may also find a useful application in other types of constructions differing from the types described above.

While the invention has been illustrated and described as embodied in the mixing of liquid and gaseous phases, it is not intended to be limited to the details shown, since various modifications and structural changes may be made without departing in any way from the spirit of the present invention.

What is claimed as new and desired to be protected by Letters Patent is set forth in the appended claims.

I claim:

1. A mixing apparatus for admixing a liquid phase and a gaseous phase, comprising in combination, a mixing vessel having a mixing chamber; first and second inlet means communicating with said chamber for respectively introducing into the same a liquid phase and continuously introducing a gaseous phase in excess of the required quantity; first and second outlet means also communicating with said chamber for respectively removing said liquid and continuously removing the excess of said gaseous phase and gaseous reaction products formed in said mixing chamber; mixing means, including rotary means arranged in said chamber for effecting admixing of said phases with concomitant formation of foam, said mixing means being subject to encountering varying degrees of retardation as a function of the consistency of the foam; and control means associated with at least one of said first means and with said mixing means, said control means being operative for controlling the level of said liquid phase in said chamber in dependence upon the degree of retardation encountered by said mixing means.

2. An apparatus as defined in claim 1, said mixing means including drive means comprising an electric motor whose requirements for electric energy fluctuate in dependence upon the degree of retardation encountered by said rotary means, and said control means being operatively associated with said electric motor so as to be operated in response to fluctuation of the electric energy requirements of the same.

3. An apparatus as defined in claim 2, said control means including an electrically operable valve associated with said one first means, and with said electric motor.

4. An apparatus as defined in claim 3, said control means also including an additional electrically operable valve associated with the other of said first means and with said electric motor.

5. An apparatus as defined in claim 2, wherein the electric energy requirements of said electric motor increase in response to increasing retardation encountered by said rotary means, and wherein said control means is operated in response to an increase in the electric energy requirements of said electric motor and in a sense effecting a decrease in the quantity of liquid phase in said chamber.

6. A method of admixing a gaseous phase and a liquid phase, comprising the steps of admitting a liquid phase and continuously admitting an excessive quantity of a gaseous phase into a mixing chamber; agitating said phases by rotating a mixing instrumentality in said mixing chamber, whereby said phases become admixed with concomitant continuous formation of foam in said mixing chamber and retardation of the rotation of said mixing instrumentality to a degree which is a function of the consistency of said foam; continuously separating at least some of the foam into its liquid and gaseous components; continuously venting the excess gaseous phase and the separated gaseous component from said mixing chamber; and controlling the level of liquid phase in said mixing chamber in dependence upon the degree of retardation experienced by said mixing instrumentality.